United States Patent
Hong et al.

(10) Patent No.: US 12,180,393 B2
(45) Date of Patent: Dec. 31, 2024

(54) POLYURETHANE ADHESIVE COMPOSITION FOR CARBON EMISSION REDUCTION AND METHOD OF PREPARING SAME

(71) Applicants: HYUNDAI MOTOR COMPANY, Seoul (KR); KIA CORPORATION, Seoul (KR)

(72) Inventors: Chae Hwan Hong, Seoul (KR); Jin Woo Choung, Suwon-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 136 days.

(21) Appl. No.: 17/549,484

(22) Filed: Dec. 13, 2021

(65) Prior Publication Data

US 2023/0062606 A1    Mar. 2, 2023

(30) Foreign Application Priority Data

Aug. 4, 2021 (KR) .................. 10-2021-0102333

(51) Int. Cl.
| | | |
|---|---|---|
| *C09D 175/08* | (2006.01) | |
| *C09J 175/08* | (2006.01) | |
| *C08K 3/016* | (2018.01) | |

(52) U.S. Cl.
CPC ............. *C09J 175/08* (2013.01); *C08K 3/016* (2018.01)

(58) Field of Classification Search
CPC .... C09J 175/08; C08G 18/4018; C08G 18/44; C08G 18/4854
See application file for complete search history.

(56) References Cited

U.S. PATENT DOCUMENTS

| | | | |
|---|---|---|---|
| 6,713,599 B1 * | 3/2004 | Hinz ................... | C08G 65/2663 528/412 |
| 2009/0306239 A1 * | 12/2009 | Mijolovic .............. | C08G 18/44 521/172 |
| 2014/0187660 A1 | 7/2014 | Allen et al. | |
| 2015/0083326 A1 | 3/2015 | Allen et al. | |
| 2015/0087736 A1 | 3/2015 | Peters | |
| 2016/0257776 A1 | 9/2016 | Jacobs et al. | |
| 2016/0333129 A1 * | 11/2016 | Hofmann ........... | C08G 18/4072 |
| 2018/0273674 A1 * | 9/2018 | Klesczewski .......... | C08G 65/26 |
| 2021/0171812 A1 | 6/2021 | Zhu et al. | |

FOREIGN PATENT DOCUMENTS

| | | | |
|---|---|---|---|
| KR | 101206126 B1 | 11/2012 | |
| KR | 20160057617 A | 5/2016 | |
| KR | 20210049796 A | 5/2021 | |
| WO | WO-2010028362 A1 * | 3/2010 | .............. B01J 31/02 |
| WO | WO-2011163250 A1 * | 12/2011 | ......... C08G 18/0823 |

OTHER PUBLICATIONS

Lee Dong Hyun, Study of rigid polyurethane foams with carbon dioxide-based polyether carbonate polyols, Department of Nonotechnology and Advanced Materials Engineering, The Graduate School Sejong University; 2020; 45 pp.

* cited by examiner

*Primary Examiner* — Michael M Dollinger
(74) *Attorney, Agent, or Firm* — Lempia Summerfield Katz LLC

(57) ABSTRACT

A polyurethane adhesive composition for carbon emission reduction, and a method of preparing same, includes polyether polyol containing a carbonate linkage, thus exhibiting a carbon emission reduction effect and good or desirable adhesion performance. The polyurethane adhesive composition is obtained by mixing a polyol mixture including polyether polyol containing a carbonate linkage and polytetramethylene glycol with an isocyanate in appropriate amounts and allowing the resulting mixture to react.

13 Claims, No Drawings

POLYURETHANE ADHESIVE COMPOSITION FOR CARBON EMISSION REDUCTION AND METHOD OF PREPARING SAME

CROSS-REFERENCE TO RELATED APPLICATION

This application claims under 35 U.S.C. § 119(a) the benefit of priority to Korean Patent Application No. 10-2021-0102333, filed on Aug. 4, 2021, the entire contents of which are incorporated herein by reference.

BACKGROUND

(a) Technical Field

The present disclosure relates to a polyurethane adhesive composition and a method of preparing the same, and more particularly to a polyurethane adhesive composition for carbon emission reduction, which includes polyether polyol containing a carbonate linkage, thus exhibiting a carbon emission reduction effect and good or desirable adhesion performance, and to a method of preparing the same.

(b) Background Art

Polyurethane adhesives for automobiles are used to bond substrates to automobile body structures. Conventional polyurethane adhesives are generally manufactured using petroleum-based polyols.

Recently, in the field of automobile parts, interest in and regulations governing the decarbonization of petrochemical materials are increasing. For decarbonization of petrochemical materials, there is a method of emitting carbon dioxide in a smaller amount or inserting carbon dioxide as a raw material in the raw material and polymer synthesis process.

Meanwhile, polyurethane, which was developed by Otto Bayer of Germany in 1937, has various constituents and good or desirable reactivity and is thus widely used in a variety of fields.

Polyurethane is a polymer compound having a plurality of urethane linkages (—NHCOO—) produced by binding of a polyol having two or more alcohol groups (—OH) and a polyisocyanate having two or more isocyanate groups (—NCO) in the molecule.

Since polyurethane enables physical properties such as hardness, thermal stability, bonding strength and the like to be controlled by changing the type or mixing ratio of raw materials, it is very important to search for new component materials and determine a mixing technique therefor.

Conventionally, no synthesis method for decarbonization of polyol and isocyanate, which are the main materials of polyurethane, has been developed, so no method of decarbonization of a polyurethane adhesive has been devised.

SUMMARY

Therefore, in light of the above, it is useful to develop a polyurethane adhesive composition capable of reducing carbon emissions by devising a polyol synthesis method that inserts carbon dioxide as a raw material and utilizing the same.

Accordingly, the present disclosure has been made keeping in mind the problems encountered in the related art. An object of the present disclosure is to provide a polyurethane adhesive composition for carbon emission reduction exhibiting a carbon emission reduction effect and good or desirable adhesion performance, Another object of the present disclosure is to provide a method of preparing the same.

The objects of the present disclosure are not limited to the foregoing and should be able to be clearly understood through the following description and to be realized by the means described in the claims and combinations thereof.

The present disclosure provides a polyurethane adhesive composition, obtained by reacting a polyol mixture including polyether polyol containing a carbonate linkage and polytetramethylene glycol and an isocyanate.

The polyurethane adhesive composition may include 100 parts by weight of the polyol mixture and 20 to 60 parts by weight of the isocyanate. The polyol mixture includes 60 to 70 wt % of the polyether polyol and 30 to 40 wt % of the polytetramethylene glycol.

The polyurethane adhesive composition may further include, based on 100 parts by weight of the polyol mixture, 0.5 to 5 parts by weight of a chain extender and 0.5 to 3 parts by weight of an additive.

The polyether polyol may contain 5 to 15 wt % of the carbonate linkage.

The polyether polyol may be polyether carbonate polyol synthesized by copolymerizing carbon dioxide and propylene oxide.

The polyether polyol may have a hydroxyl group value of 40 to 80 mg KOH/g.

The polyether polyol may have a weight average molecular weight (Mw) of 1500 to 2500 g/mol.

The polytetramethylene glycol may have a weight average molecular weight (Mw) of 1900 to 2100 g/mol.

The isocyanate may include at least one selected from the group comprising or consisting of mono-isocyanate, diisocyanate, and combinations thereof.

The isocyanate may include methylene diphenyl diisocyanate represented by Chemical Formula 1 below.

[Chemical Formula 1]

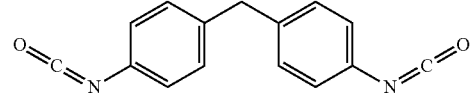

The isocyanate may have 2.0 to 2.5 functional groups.

The chain extender may include at least one selected from the group comprising or consisting of a diol, triol, tetraol, diamine, aminoalcohol, and combinations thereof.

The additive may include at least one selected from the group comprising or consisting of a halogen-based flame retardant, a phosphorus-based flame retardant, an inorganic flame retardant, and combinations thereof.

In addition, the present disclosure provides a method of preparing a polyurethane adhesive composition, including preparing a polyol mixture including polyether polyol containing a carbonate linkage and polytetramethylene glycol and obtaining a first reaction product by mixing the polyol mixture with an isocyanate.

The obtaining of the first reaction product may be performed at a temperature of 80 to 90° C.

The obtaining of the first reaction product may include mixing the alcohol group (—OH) of the polyol mixture and the isocyanate group (—NCO) of the isocyanate at a ratio of 1:0.5-1.8.

The method may further include obtaining a second reaction product by mixing the first reaction product with a chain extender and an additive.

The obtaining the second reaction product may be performed at a temperature of 90 to 100° C.

According to the present disclosure, a polyurethane adhesive composition can exhibit good or desirable adhesion performance regardless of the type of material thereof by mixing a polyol mixture including polyether polyol containing a carbonate linkage and polytetramethylene glycol with an isocyanate in appropriate amounts and allowing the resulting mixture to react.

In addition, a method of preparing the polyurethane adhesive composition according to the present disclosure uses polyether polyol capable of exhibiting a carbon emission reduction effect. Thereby, carbon dioxide emissions are reduced compared to a polyurethane adhesive using petroleum-based polyether polyol when preparing a polyurethane adhesive composition.

The effects of the present disclosure are not limited to the foregoing and should be understood to include all effects that may be reasonably anticipated from the following description.

DETAILED DESCRIPTION

The above and other objects, features, and advantages of the present disclosure should be more clearly understood from the following embodiments taken in conjunction with the accompanying drawings. However, the present disclosure is not limited to the embodiments disclosed herein and may be modified into different forms. These embodiments are provided to thoroughly explain the inventive concept and to sufficiently transfer the spirit of the present disclosure to those having ordinary skill in the art.

It should be further understood that the terms "comprise", "include", "have", etc., when used in this specification, specify the presence of stated features, integers, steps, operations, elements, components, or combinations thereof. Such terms do not preclude the presence or addition of one or more other features, integers, steps, operations, elements, components, or combinations thereof.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others. Thus, such numbers, values, and/or representations should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

In the present specification, when a range is described for a variable, it should be understood that the variable includes all values within the stated range, including the end points. For example, the range of "5 to 10" should be understood to include any subranges, such as 6 to 10, 7 to 10, 6 to 9, 7 to 9 and the like, as well as individual values of 5, 6, 7, 8, 9 and 10. The range should also be understood to include any value between valid integers within the stated range, such as 5.5, 6.5, 7.5, 5.5 to 8.5, 6.5 to 9, and the like. Also, for example, the range of "10% to 30%" should be understood to include subranges, such as 10% to 15%, 12% to 18%, 20% to 30%, etc., as well as all integers including values of 10%, 11%, 12%, 13% and the like up to 30%. The range should also be understood to include any value between valid integers within the stated range, such as 10.5%, 15.5%, 25.5%, and the like.

A polyurethane adhesive composition according to the present disclosure is obtained by reacting a polyol mixture including polyether polyol containing a carbonate linkage and polytetramethylene glycol with an isocyanate.

Specifically, the polyurethane adhesive composition further includes a chain extender and an additive and may include 100 parts by weight of a polyol mixture, 20 to 60 parts by weight of an isocyanate, 0.5 to 5 parts by weight of a chain extender, and 0.5 to 3 parts by weight of an additive.

The individual components of the polyurethane adhesive composition according to the present disclosure are specified below.

(A) Polyol Mixture

A polyol mixture is included in an amount of 100 parts by weight in the polyurethane adhesive composition and may include polyether polyol and polytetramethylene glycol.

1) Polyether Polyol

Polyether polyol contains a carbonate linkage and may be included in an amount of 60 to 70 wt % based on the total amount of the polyol mixture.

The polyether polyol may serve to facilitate processing in the polyurethane adhesive composition due to the low viscosity thereof.

The polyether polyol may have a hydroxyl group value of 40 to 80 mg KOH/g and an average molecular weight (Mw) of 1500 to 2500 g/mol.

The polyether polyol may contain 5 to 15 wt % of a carbonate linkage.

Specifically, the polyether polyol may be polyether carbonate polyol prepared by copolymerizing carbon dioxide and propylene oxide, as represented in Chemical Scheme 1 below.

[Chemical Scheme 1]

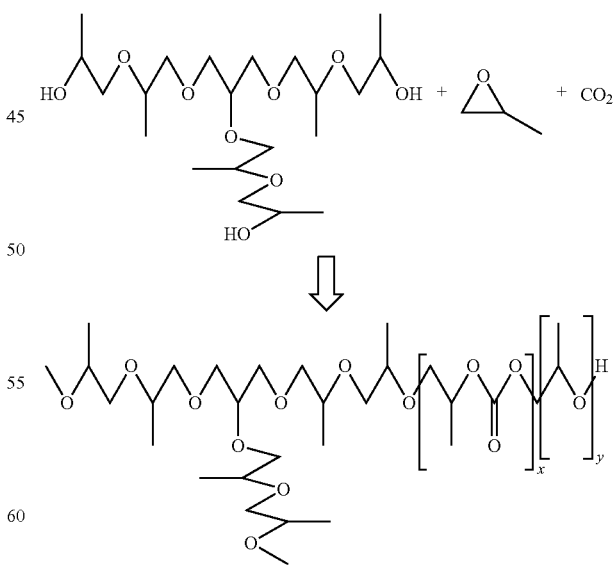

The polyether carbonate polyol may be a polyol in which a carbonate linkage is chemically contained in the chain structure of the polyether polyol by applying carbon dioxide in the synthesis step.

During the synthesis of polyether carbonate polyol, a polyol material is synthesized by adding carbon dioxide as a reactant. It is possible to reduce carbon dioxide emissions compared to conventional petroleum-based preparation in the synthesis method. The polyether carbonate polyol used in the present disclosure is a polyol including 20% of a carbon-dioxide-based material, and ultimately, the use of petrochemicals in the preparation process may be reduced by 20%. Here, in the polyether carbonate polyol, the synthesized material contains carbon dioxide, and the amount of propylene oxide that is conventionally used is decreased in proportion to the amount of carbon dioxide that is contained. Thus, there is an effect of reducing carbon dioxide emissions from the aspects of final products and synthesis processes.

2) Polytetramethylene Glycol (PTMG)

Polytetramethylene glycol is a good, i.e., desirable or useful compound having a high elastic modulus, excellent low-temperature characteristics, low permanent compression strain, superior hydrolysis resistance, and an excellent surface tactile sensation.

The polytetramethylene glycol may be included in an amount of 30 to 40 wt % based on the total amount of the polyol mixture. Here, if the amount of polytetramethylene glycol is less than 30 wt %, hydrolysis resistance may be deteriorated. On the other hand, if the amount of polytetramethylene glycol exceeds 40 wt %, hydrolysis resistance may be increased, but mechanical properties may be comparatively deteriorated, which is undesirable.

The polytetramethylene glycol may have a weight average molecular weight (Mw) of 1900 to 2100 g/mol. When polytetramethylene glycol having a weight average molecular weight (Mw) in the above range is applied to a polyurethane adhesive, an adhesive having superior flexibility, low-temperature characteristics, and tensile strength may be manufactured.

(B) Isocyanate

An isocyanate may be included in an amount of 20 to 60 parts by weight, and, in one example, 30 to 50 parts by weight, based on 100 parts by weight of the polyol mixture in the polyurethane adhesive composition. Here, if the amount of the isocyanate is less than 20 parts by weight, the adhesion performance of the final material may be deteriorated. On the other hand, if the amount of the isocyanate exceeds 60 parts by weight, viscoelastic properties useful for an adhesive may not be exhibited due to the excessive chemical reaction and increased hardness.

The isocyanate is a component that is added in the preparation of polyurethane and serves to undergo a chemical reaction with the polyol.

The isocyanate may play a role in making the distribution of hard and soft segments in the polyurethane structure uniform through the chemical reaction involving the polyol.

The isocyanate may include at least one selected from the group comprising or consisting of mono-isocyanate, diisocyanate, and combinations thereof.

Specifically, the isocyanate may include methylene diphenyl diisocyanate (MDI) represented by Chemical Formula 1 below.

[Chemical Formula 1]

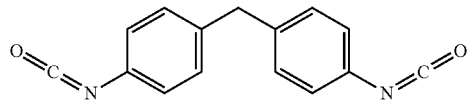

The isocyanate has 2.0 to 2.5 functional groups (e.g. based on a proportion of mono-isocyanate, diisocyanate, or combinations thereof in the isocyanate) and may exist in a liquid state at room temperature.

(C) Chain Extender

A chain extender may be included in an amount of 0.5 to 5 parts by weight based on 100 parts by weight of the polyol mixture in the polyurethane adhesive composition. Here, if the amount of the chain extender is less than 0.5 parts by weight, the structure of the final material is unstable, so mechanical properties and durability may be deteriorated. On the other hand, if the amount of the chain extender exceeds 5 parts by weight, local variations in physical properties may occur due to excessive crosslinking, so uniform performance as an adhesive may be deteriorated.

The chain extender serves to extend the polyurethane chain and may include at least one selected from the group comprising or consisting of a diol, triol, tetraol, diamine, aminoalcohol, and combinations thereof.

Specifically, the chain extender in one example may be 1,4-butanediol.

(D) Additive

An additive serves to impart various functionalities to the polyurethane adhesive composition, and the additive may be used without any particular limitation within a range that does not impair the effects of the present disclosure.

The additive is used to increase the low flame retardancy of the polyurethane adhesive.

The additive may include a reactive flame retardant and an additive flame retardant. Specifically, it may include at least one selected from the group comprising or consisting of a halogen-based flame retardant, a phosphorus-based flame retardant, an inorganic flame retardant, and combinations thereof.

The additive may be included in an amount of 0.5 to 3 parts by weight based on 100 parts by weight of the polyol mixture in the polyurethane adhesive composition. Here, if the amount of the additive is less than 0.5 parts by weight, the resulting flame retardancy may not meet flame retardancy specifications for automobile interior materials. On the other hand, if the amount of the chain extender exceeds 3 parts by weight, the final product may be discolored due to excessive use of the flame retardant.

The method of preparing the polyurethane adhesive composition according to the present disclosure as described above includes preparing a polyol mixture including polyether polyol containing a carbonate linkage and polytetramethylene glycol and obtaining a first reaction product by mixing the polyol mixture with an isocyanate.

The method of preparing the polyurethane adhesive composition may further include obtaining a second reaction product by mixing the first reaction product with a chain extender and an additive.

The individual steps of the method of preparing the polyurethane adhesive composition according to the present disclosure are specified below.

First, in the step of preparing the polyol mixture, polyether polyol containing a carbonate linkage and polytetramethylene glycol may be mixed.

Here, the polyol mixture may be obtained by mixing 60 to 70 wt % of polyether polyol and 30 to 40 wt % of polytetramethylene glycol.

Next, in the step of obtaining the first reaction product, the first reaction product may be synthesized by mixing 100 parts by weight of the polyol mixture and 20 to 60 parts by weight of an isocyanate.

In the step of obtaining the first reaction product, the reaction may be carried out at 80 to 90° C. If the reaction temperature is lower than 80° C., the reaction may occur slowly, whereas if the reaction temperature is higher than 90° C., the reaction rate is too fast, making it difficult to form a uniform internal density through mixing.

Finally, in the step of obtaining the second reaction product, the second reaction product may be synthesized as a final reaction product by mixing 0.5 to 5 parts by weight of a chain extender and 0.5 to 3 parts by weight of an additive based on 100 parts by weight of the polyol mixture.

In the step of obtaining the second reaction product, the reaction may be carried out at 90 to 100° C. If the reaction temperature is lower than 90° C., the chemical reaction may be non-uniform, whereas if the reaction temperature is higher than 100° C., a chemical structure imbalance may occur in the final product due to the excessive reaction.

In the method of preparing the polyurethane adhesive composition according to the present disclosure, the first reaction product and the second reaction product are obtained through stepwise reactions at different temperatures. Thus, the distribution of the hard and soft segments in the polyurethane structure is made uniform and the internal density thereof is evenly distributed. As a result, a polyurethane adhesive composition having improved adhesion performance and durability may be obtained.

In the step of obtaining the second reaction product, the alcohol group (—OH) of the polyol mixture and the isocyanate group (—NCO) of the isocyanate may be mixed at a ratio of 1:0.5-1.8. In one example, the ratio of —OH to —NCO is 1:1.3-1.6. Here, if the ratio thereof is less than 1:0.5, excess polyol component is present. Thus, the surface may become very sticky due to high viscosity after formation of polyurethane and unreacted polyol may remain in the product, resulting in deteriorated adhesion performance. On the other hand, if the ratio thereof exceeds 1:1.8, excess unreacted isocyanate functional groups are present. Thus, performance and durability as an adhesive may be deteriorated.

The density of the polyurethane adhesive composition prepared by the method according to the present disclosure may be 30 to 140 kg/m$^3$.

Meanwhile, the polyurethane adhesive composition is not limited with regard to the fields of use thereof but may be used as an adhesive material for automobile parts. In particular, it exhibits high adhesion performance for bonding of various materials and heterogeneous materials applied to automobiles and thus may be industrially useful.

A better understanding of the present disclosure may be obtained through the following examples. These examples are merely set forth to illustrate the present disclosure and are not to be construed as limiting the present disclosure.

The respective compositions of Examples 1 to 6 were prepared in the following manner using components in the amounts shown in Table 1 below.

Examples 1 to 3

Polyether carbonate polyol and polytetramethylene glycol were mixed under conditions of 1 atm and 30-32° C., after which the temperature was raised to 80-90° C. Then, methylene diphenyl diisocyanate was added thereto and the resulting mixture was stirred at 500 to 700 rpm using a stirrer to prepare a first reaction product.

Subsequently, the temperature was raised to 90-100° C. Then, 1,4-butanediol as a chain extender was added to the first reaction product and mixed therewith, whereby a second reaction product was prepared.

Examples 4 to 6

A second reaction product was prepared in the same manner as in Examples 1 to 3, with the exception that a flame retardant was further added when the chain extender was added.

TABLE 1

| Classification (unit: wt %) | | Example 1 | Example 2 | Example 3 | Example 4 | Example 5 | Example 6 |
|---|---|---|---|---|---|---|---|
| Polyol mixture | Polyether carbonate polyol | 66.6 | 69 | 69.5 | 66.9 | 69 | 66.4 |
| | Polytetramethylene glycol | 33.4 | 31 | 30.5 | 33.1 | 31 | 33.6 |

| Classification (unit: parts by weight) | | Example 1 | Example 2 | Example 3 | Example 4 | Example 5 | Example 6 |
|---|---|---|---|---|---|---|---|
| Polyol mixture | | 100 | 100 | 100 | 100 | 100 | 100 |
| Chain extender | 1,4-butanediol | 3 | 3 | 4 | 4 | 4 | 5 |
| Flame retardant | Inorganic flame retardant | — | — | — | 1.5 | 1.5 | 1.5 |
| Isocyanate | Methylene diphenyl diisocyanate | 50 | 50 | 50 | 50 | 50 | 50 |

1. Polyether carbonate polyol: Own synthesized product (Hyundai Motors)
2. Polytetramethylene glycol: Mitsubishi Chemical, Japan, PTMEG-2000 (molecular weight: 2,000 g/mol)
3. 1,4-butanediol: Sigma Aldrich
4. Methylene diphenyl diisocyanate: Sigma Aldrich Also, the respective compositions of Comparative Examples 1 to 6 were prepared in the following manner using components in the amounts shown in Table 2 below.

Comparative Examples 1 to 3

A polyurethane adhesive composition was prepared in the same manner as in Examples 1 to 3, with the exception that a petroleum-based polyether polyol was used in lieu of the polyether polyol containing a carbonate linkage.

Comparative Examples 4 to 6

A polyurethane adhesive composition was prepared in the same manner as in Examples 4 to 6, with the exception that a petroleum-based polyether polyol was used in lieu of the polyether polyol containing a carbonate linkage.

TABLE 2

| Classification (unit: wt %) | | Comparative Example 1 | Comparative Example 2 | Comparative Example 3 | Comparative Example 4 | Comparative Example 5 | Comparative Example 6 |
|---|---|---|---|---|---|---|---|
| Polyol mixture | Petroleum-based polyether polyol | 66.6 | 69 | 69.5 | 66.9 | 69 | 66.4 |
| | Polytetramethylene glycol | 33.4 | 31 | 30.5 | 33.1 | 31 | 33.6 |

| Classification (unit: parts by weight) | | Comparative Example 1 | Comparative Example 2 | Comparative Example 3 | Comparative Example 4 | Comparative Example 5 | Comparative Example 6 |
|---|---|---|---|---|---|---|---|
| Polyol mixture | | 100 | 100 | 100 | 100 | 100 | 100 |
| Chain extender | 1,4-butanediol | 3 | 3 | 4 | 4 | 4 | 5 |
| Flame retardant | Inorganic flame retardant | — | — | — | 1.5 | 1.5 | 1.5 |
| Isocyanate | Methylene diphenyl diisocyanate | 50 | 50 | 50 | 50 | 50 | 50 |

1. Petroleum-based polyether polyol: Korea Polyol, FA-702
2. Polytetramethylene glycol: Mitsubishi Chemical, Japan, PTMEG-2000 (molecular weight: 2,000 g/mol)
3. 1,4-butanediol: Sigma Aldrich
4. Methylene diphenyl diisocyanate: Sigma Aldrich Test Example The physical properties of the samples of the polyurethane adhesive compositions according to Examples and Comparative Examples were measured through the following method. The results thereof are shown in Tables 3 and 4 below.

[Evaluation Method]

Adhesion Shear Test Method:

Two samples of each of stainless steel, aluminum, polycarbonate (PC), and polymethyl methacrylate (PMMA) were prepared to a size of 100 mm×25 mm×2 mm.

The two samples were then disposed such that an overlapping area (25 mm×12.5 mm) was formed therebetween.

Next, the polyurethane adhesive prepared according to the present disclosure was applied on the overlapping area, maintained at 110° C. for 30 minutes, and then left in an environment having a relative humidity of 50% for 7 days.

Finally, the adhesion shear strength was measured at a head speed of 5 mm/min using a universal tensile tester (ASTM D1002).

TABLE 3

| Classification | Adhesion shear strength test (substrate: steel) (MPa) | Adhesion shear strength test (substrate: aluminum) (MPa) | Adhesion shear strength test (substrate: PC) (MPa) | Adhesion shear strength test (substrate: PMMA) (MPa) |
|---|---|---|---|---|
| Example 1 | 3.9 | 3.7 | 4 | 4 |
| Example 2 | 3.9 | 3.8 | 4.1 | 4 |
| Example 3 | 3.9 | 3.7 | 4.1 | 4.1 |
| Example 4 | 3.8 | 3.6 | 4 | 4 |
| Example 5 | 3.9 | 3.9 | 4 | 4 |
| Example 6 | 3.8 | 3.8 | 4 | 4 |

TABLE 4

| Classification | Adhesion shear strength test (substrate: steel) (MPa) | Adhesion shear strength test (substrate: aluminum) (MPa) | Adhesion shear strength test (substrate: PC) (MPa) | Adhesion shear strength test (substrate: PMMA) (MPa) |
|---|---|---|---|---|
| Comparative Example 1 | 3.5 | 3.3 | 3.4 | 3.4 |
| Comparative Example 2 | 3.4 | 3.3 | 3.4 | 3.5 |
| Comparative Example 3 | 3.4 | 3.3 | 3.2 | 3.5 |
| Comparative Example 4 | 3.5 | 3.3 | 3.4 | 3.4 |
| Comparative Example 5 | 3.5 | 3.3 | 3.3 | 3.5 |
| Comparative Example 6 | 3.4 | 3.2 | 3.4 | 3.4 |

As is apparent from Table 3, Examples 1 to 6 using the polyol containing a carbonate linkage exhibited bonding strength of 3.8 to 3.9 MPa, 3.6 to 3.9 MPa, 4.0 to 4.1 MPa, and 4.0 to 4.1 MPa with steel, aluminum, polycarbonate, and polymethyl methacrylate, respectively, indicating high adhesion performance. Therefore, it can be concluded that the polyurethane adhesive composition according to the present disclosure, when prepared using individual components in appropriate amounts, exhibits excellent quality without variation within each sample.

In contrast, as is apparent from Table 4, Comparative Examples 1 to 6 not using the polyol containing a carbonate linkage exhibited bonding strength of 3.4 to 3.5 MPa, 3.2 to 3.3 MPa, 3.2 to 3.4 MPa, and 3.4 to 3.5 MPa with steel, aluminum, polycarbonate, and polymethyl methacrylate, respectively. Thereby, it was confirmed that Comparative Examples using the petroleum-based polyether polyol exhibited vastly inferior adhesion performance compared to the bonding strength of Examples according to the present disclosure.

Therefore, the polyurethane adhesive composition according to the present disclosure can exhibit good or desirable adhesion performance regardless of the type of material thereof by mixing a polyol mixture including polyether polyol containing a carbonate linkage and polytetramethylene glycol with an isocyanate in appropriate amounts and allowing the resulting mixture to react, unlike petroleum-based polyurethane adhesive compositions.

Although specific embodiments of the present disclosure have been described, those having ordinary skill in the art should appreciate that the present disclosure may be embodied in other specific forms without changing the technical spirit or features thereof. Thus, the embodiments described above should be understood to be non-limiting and illustrative in every way.

What is claimed is:

1. A polyurethane adhesive composition, obtained by reacting:
   a polyol mixture comprising polyether polyol containing a carbonate linkage and polytetramethylene glycol; and
   an isocyanate,
   wherein the polyurethane adhesive composition comprises, based on 100 parts by weight of the polyol mixture, 20 to 60 parts by weight of the isocyanate and 0.5 to 5 parts by weight of a chain extender,
   wherein the polyol mixture comprises 60 to 70 wt % of the polyether polyol and 30 to 40 wt % of the polytetramethylene glycol,
   wherein the polyether polyol is prepared by copolymerizing as represented in the below chemical scheme

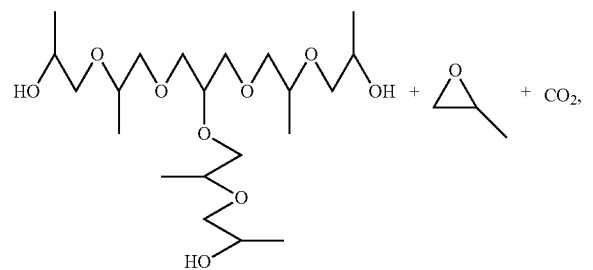

wherein the polyether polyol has a weight average molecular weight (Mw) of 1500 to 2500 g/mol, and
   wherein the isocyanate comprises methylene diphenyl diisocyanate.

2. The polyurethane adhesive composition of claim 1, further comprising, based on 100 parts by weight of the polyol mixture, 0.5 to 3 parts by weight of an additive.

3. The polyurethane adhesive composition of claim 1, wherein the chain extender comprises at least one selected from the group consisting of a diol, triol, tetraol, diamine, aminoalcohol, and combinations thereof.

4. The polyurethane adhesive composition of claim 2, wherein the additive comprises at least one selected from the group consisting of a halogen-based flame retardant, a phosphorus-based flame retardant, an inorganic flame retardant, and combinations thereof.

5. The polyurethane adhesive composition of claim 1, wherein the polyether polyol contains 5 to 15 wt % of the carbonate linkage.

6. The polyurethane adhesive composition of claim 1, wherein the polyether polyol has a hydroxyl group value of 40 to 80 mg KOH/g.

7. The polyurethane adhesive composition of claim 1, wherein the polytetramethylene glycol has a weight average molecular weight (Mw) of 1900 to 2100 g/mol.

8. The polyurethane adhesive composition of claim 1, wherein the isocyanate has 2.0 to 2.5 functional groups.

9. A method of preparing a polyurethane adhesive composition, the method comprising:
   preparing a polyol mixture comprising polyether polyol containing a carbonate linkage and polytetramethylene glycol; and
   obtaining a first reaction product by mixing the polyol mixture with an isocyanate, wherein the first reaction product is synthesized by mixing 100 parts by weight of the polyol mixture, 20 to 60 parts by weight of an isocyanate, and 0.5 to 5 parts by weight of a chain extender,
   wherein the polyol mixture comprises 60 to 70 wt % of the polyether polyol and 30 to 40 wt % of the polytetramethylene glycol,
   wherein the polyether polyol is prepared by copolymerizing as represented in the below chemical scheme

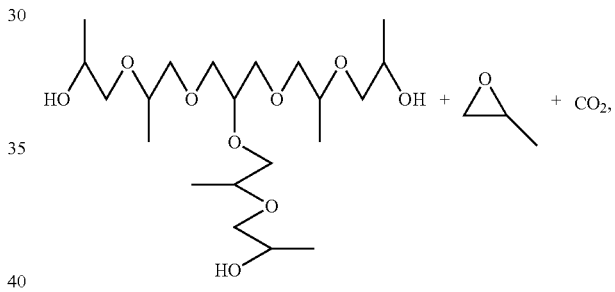

wherein the polyether polyol has a weight average molecular weight (Mw) of 1500 to 2500 g/mol, and
   wherein the isocyanate comprises methylene diphenyl diisocyanate.

10. The method of claim 9, wherein the obtaining of the first reaction product is performed at a temperature of 80 to 90° C.

11. The method of claim 9, wherein the obtaining of the first reaction product comprises mixing an alcohol group (—OH) of the polyol mixture and an isocyanate group (—NCO) of the isocyanate at a ratio of 1:0.5-1.8.

12. The method of claim 9, further comprising obtaining a second reaction product by mixing the first reaction product with an additive.

13. The method of claim 12, wherein the obtaining of the second reaction product is performed at a temperature of 90 to 100° C.

* * * * *